United States Patent
Chen et al.

(10) Patent No.: US 9,703,086 B1
(45) Date of Patent: Jul. 11, 2017

(54) BEAM SPLITTER

(71) Applicant: ORANGETEK CORPORATION, Changhua County (TW)

(72) Inventors: Po-Chuan Chen, Changhua County (TW); Chun-Chieh Chen, Changhua County (TW); Hsuan-Yi Li, Changhua County (TW)

(73) Assignee: ORANGETEK CORPORATION, Changhua County (TW)

( * ) Notice: Subject to any disclaimer, the term of this patent is extended or adjusted under 35 U.S.C. 154(b) by 0 days.

(21) Appl. No.: 14/984,407

(22) Filed: Dec. 30, 2015

(51) Int. Cl.
*G02B 6/42* (2006.01)
*G02B 17/08* (2006.01)
*G02B 6/32* (2006.01)

(52) U.S. Cl.
CPC .......... *G02B 17/086* (2013.01); *G02B 6/32* (2013.01); *G02B 6/4206* (2013.01); *G02B 6/4208* (2013.01); *G02B 6/4214* (2013.01); *G02B 6/4286* (2013.01)

(58) Field of Classification Search
CPC ................................. G02B 6/42; G02B 6/4215
USPC .......................................................... 385/33
See application file for complete search history.

(56) References Cited

U.S. PATENT DOCUMENTS

| | | | |
|---|---|---|---|
| 5,140,242 A * | 8/1992 | Doran et al. | 318/640 |
| 5,303,322 A * | 4/1994 | Winston et al. | 385/146 |
| 5,600,741 A * | 2/1997 | Hauer et al. | 385/35 |
| 6,567,435 B1 * | 5/2003 | Scott et al. | 372/29.021 |
| 7,061,949 B1 * | 6/2006 | Zhou et al. | 372/36 |
| 7,151,596 B2 * | 12/2006 | Takahashi et al. | 356/138 |
| 7,548,670 B2 * | 6/2009 | Ijzerman et al. | 385/33 |
| 7,616,845 B2 * | 11/2009 | Matsuoka et al. | 385/14 |
| 7,733,439 B2 * | 6/2010 | Sampsell et al. | 349/62 |
| 8,532,449 B2 * | 9/2013 | Mohammed et al. | 385/33 |
| 8,777,497 B2 * | 7/2014 | Kim et al. | 385/93 |
| 8,979,392 B2 * | 3/2015 | Lin | 385/93 |
| 9,151,916 B2 * | 10/2015 | Pommer et al. | 385/79 |
| 9,213,156 B2 * | 12/2015 | Amit | 385/93 |
| 2002/0057883 A1 * | 5/2002 | Malone et al. | 385/136 |
| 2004/0131302 A1 * | 7/2004 | Kouta et al. | 385/14 |
| 2010/0265974 A1 * | 10/2010 | Wang | 372/29.011 |
| 2010/0295063 A1 * | 11/2010 | Morioka | 257/80 |
| 2011/0057204 A1 * | 3/2011 | Morioka | 257/84 |
| 2012/0133943 A1 * | 5/2012 | Fontaine et al. | 356/445 |
| 2012/0224817 A1 * | 9/2012 | Hayashi | 385/93 |
| 2013/0259423 A1 * | 10/2013 | Charbonneau-Lefort | 385/33 |
| 2014/0084148 A1 * | 3/2014 | Shao et al. | 250/237 G |
| 2014/0086579 A1 * | 3/2014 | Shao et al. | 398/38 |

(Continued)

*Primary Examiner* — Kaveh C Kianni

(57) ABSTRACT

A beam splitter contains: a body, a main reflection portion, a sub reflection portion, and a refraction portion. The body includes an inlet and an outlet. The main reflection portion is located on a first side of the body, and the main reflection portion and the outlet have a first rotating angle and a second rotating angle respectively so that the main reflection portion reflects an external beam to produce a main beam. The sub reflection portion is located on the first side of the body, and the sub reflection portion reflects the external beam to produce a sub beam. The refraction portion is located on a second side of the body and has a third rotating angle different from the inlet, the sub beam projects out of the refraction portion to produce a deflective projection angle of the sub beam.

17 Claims, 4 Drawing Sheets

(56) References Cited

U.S. PATENT DOCUMENTS

2014/0241672 A1\* 8/2014 Isenhour et al. ............... 385/79
2015/0362685 A1\* 12/2015 Shah ............................. 385/93

\* cited by examiner

BEAM SPLITTER

FIELD OF THE INVENTION

The present invention relates to an optical element, and more particularly to a beam splitter which changes beam projection angle.

BACKGROUND OF THE INVENTION

A conventional beam splitter is configured to transmit signals quickly in an optical transmission manner, but during optical transmission, it is necessary to convert electrical signals into optical signals through a light emitting element and a monitor photo diode (MPD), thus monitoring light emitting state and adjusting luminescence of the light emitting element.

The conventional beam splitter contains a plurality of reflecting lens configured to split external beam to two sub beams of different paths from the light emitting element, and one of the two sub beams is collimated by collimating lens and projects on the monitor photo diode.

However, as splitting the external beam by using the plurality of reflecting lens, the light emitting element has to keep a distance from the monitor photo diode so that the plurality of reflecting lens refract the two sub beams, and the two sub beams project to the monitor photo diode, so the beam splitter cannot be miniaturized. Furthermore, it is troublesome to assemble the plurality of reflecting lens.

The present invention has arisen to mitigate and/or obviate the afore-described disadvantages.

SUMMARY OF THE INVENTION

The primary objective of the present invention is to provide a beam splitter which changes path of split beam so as to adjust a distance between a monitor photo diode (MPD) and a light emitting element and to miniaturize the beam splitter.

To obtain the above objective, a beam splitter provided by the present invention contains: a body, a main reflection portion, a sub reflection portion, and a refraction portion.

The body includes an inlet and an outlet, the inlet is configured to receive external beam.

The main reflection portion is located on a first side of the body, and the main reflection portion and the outlet have a first rotating angle and a second rotating angle respectively so that the main reflection portion reflects the external beam to produce a main beam.

The sub reflection portion is located on the first side of the body adjacent to the main reflection portion, and between the sub reflection portion and the main reflection portion defines an angle, the sub reflection portion reflects the external beam to produce a sub beam.

The refraction portion is located on a second side of the body proximate to the inlet and has a third rotating angle different from the inlet, the sub beam projects out of the refraction portion so as to produce a deflective projection angle of the sub beam.

In one embodiment, the beam splitter further contains a monitor photo diode located outside the body proximate to the light emitting element and corresponding to the second side of the body, wherein the monitor photo diode is configured to detect an intensity of the sub beam.

In one embodiment, a location of the monitor photo diode is adjusted based on the sub beam through the refraction portion and a setting location of the sub reflection portion.

In one embodiment, the beam splitter further contains a first collimating lens arranged on the inlet so as to collimate the external beam.

In one embodiment, the beam splitter further contains a second collimating lens arranged on the outlet so as to collimate the main beam.

In one embodiment, the at least one of the main reflection portion and the sub reflection is a mirror.

In one embodiment, the at least one of the main reflection portion and the sub reflection is a reflecting film formed on the first side of the body.

In one embodiment, the reflecting film is made of metal.

In one embodiment, the main reflection portion has a main antireflection film formed on the first side of the body, and the sub reflection portion has a sub antireflection film formed on the first side of the body and its refractive index is different from the body.

In one embodiment, the refraction portion is a lens and its refractive indexes is different from that of air.

In one embodiment, the refractive index of the refraction portion is more than that of air.

DETAILED DESCRIPTION OF THE PREFERRED EMBODIMENTS

Figure 1:
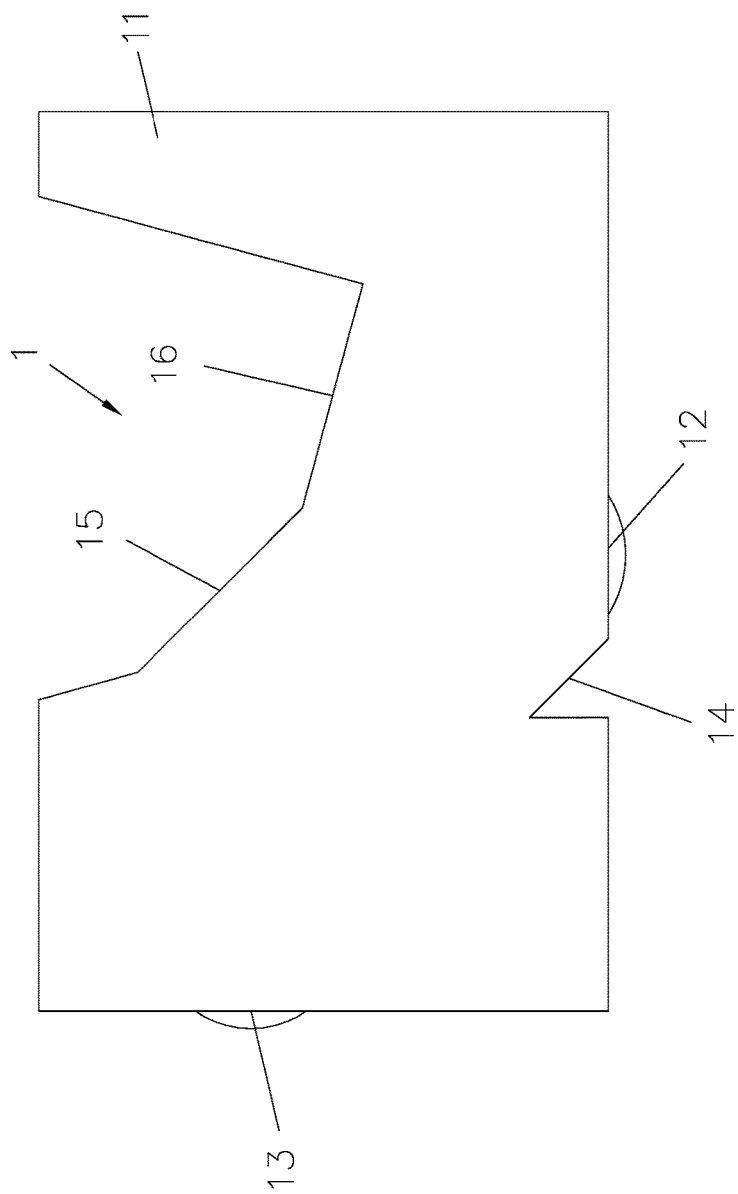
FIG. 1 is a side plan view showing the assembly of a beam splitter according to a first embodiment of the present invention.
Figure 2:
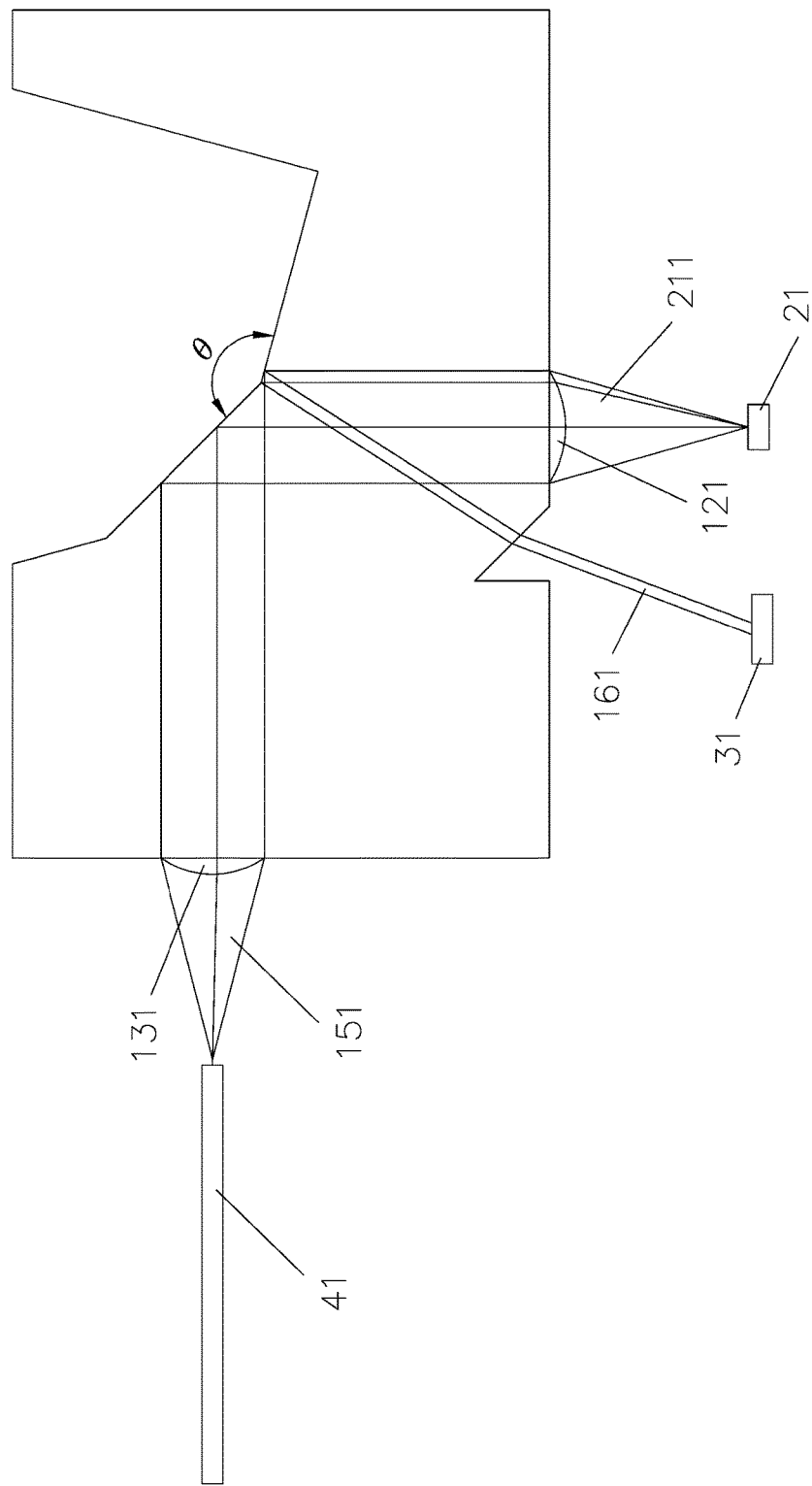
FIG. 2 is a side plan view showing the operation of the beam splitter according to the first embodiment of the present invention.

As shown in FIGS. 1 and 2, a beam splitter 1 according to a first embodiment of the present invention comprises: a body 11, a main reflection portion 15, a sub reflection portion 16, and a refraction portion 14.

The body 11 includes an inlet 12 configured to receive an external beam and an outlet 13, the inlet 12 is located on a first side of the body 11 and includes a first collimating lens 121 arranged thereon to collimate the external beam. The outlet 13 includes a second collimating lens 131 arranged thereon to collimate the external beams through the outlet 13. The main reflection portion 15 is located on a second side of the body 11, and the main reflection portion 15 and the outlet 13 have a first rotating angle and a second rotating angle respectively so that between the main reflection portion 15 and the external beam defines a first angle, wherein the first angle is within 35 degrees to 50 degrees. Preferably, the first angle is 45 degrees. The main reflection portion 15 is a mirror, such as a completely reflecting mirror, so as to reflect the external beam to produce a main beam 151. The sub reflection portion 16 is located on the second side of the body 11 adjacent to the main reflection portion 15, and between the sub reflection portion 16 and the main reflection portion 15 defines a second angle θ, wherein the second angle θ is within 135 degrees to 170 degrees, and the sub reflection portion 16 is a mirror, such as a completely reflecting mirror, so as to reflect the external beam to produce a sub beam 161.

The refraction portion 14 is located on the first side of the body 11 proximate to the inlet 12 and has a third rotating angle different from the inlet 12. A refractive index of the refraction portion 14 is different from that of air so as to change a deflective projection angle of the sub beam 16. The refraction portion 14 is a combination of a lens, a first film, a transparent substrate, and a second film of various refractive indexes or is made of specific material which changes beam projection angle.

A light emitting element 21 corresponds to the inlet 12 of the body 11 and is any one of a laser diode, a light emitting diode (LED), a vertical-cavity surface-emitting laser (VCSEL), and other similar light source.

The monitor photo diode 31 is located outside the body 11 proximate to the light emitting element 21 and corresponds to the first side of the body 11, a distance between the monitor photo diode 31 and the light emitting element 21 determines based on a fourth rotating angle of the sub reflection portion 16 or/and the refractive index of the refraction portion 14, wherein the monitor photo diode 31 detects an intensity of the sub beam 161 and receives the sub beam 161 through the outlet 13 so as to adjust beam intensity of the light emitting element 21.

An optical fiber 41 is located outside the body 11 and corresponds to the outlet 13 so as to receive the main beam 15 through the outlet 13 and transmits the main beam 151.

Preferably, a plurality of beam splitters are configured in a linear arrangement or an array arrangement so as to form a light splitting module.

After the light emitting element 21 receives electronic signals, the electronic signals are converted into a transmitted beam 211, and the transmitted beam 211 is collimated by the first collimating lens 121, transmits through the inlet 12, and projects on the main reflection portion 15 and the sub reflection portion 16 so as to form the main beam 151 and the sub beam 161, respectively. The main beam 151 enters into the optional fiber 41 via the outlet 13 and the first collimating lens 121, and the sub reflection portion 16 reflects the transmitted beam 211 to produce the sub beam 161, the sub beam 161 projects out of the refraction portion 14. In the meantime, the deflective projection angle of the sub beam 161 changes because the refractive index of the refraction portion 14 is different from that of air.

When the refractive index of the refraction portion 14 is more than that of air, the deflective projection angle of the sub beam 161 changes so that the sub beam 161 is close to the light emitting element 21, and the distance between the monitor photo diode 31 and the light emitting element 21 decreases, thus miniaturizing the beam splitter 1.

Figure 3:
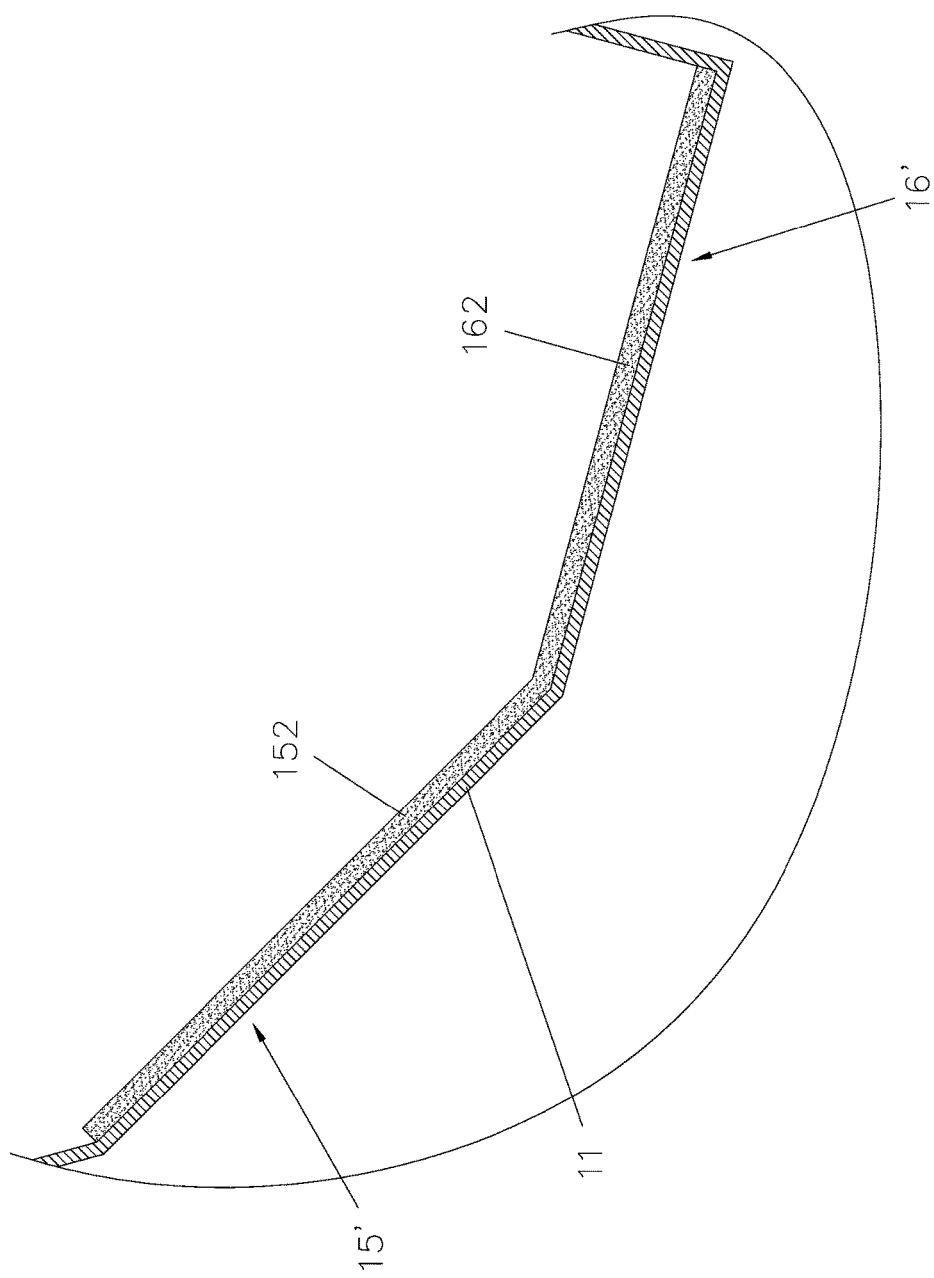
FIG. 3 is a perspective view showing the assembly of a part of a beam splitter according to a second embodiment of the present invention.

Referring to FIG. 3, a beam splitter 1 of a second embodiment from that of the first embodiment comprises: a main reflecting film 152 formed on a main reflection portion 15' of a second side of a body 11, wherein the main reflecting film 152 is made of any one of gold, silver, and copper in a vacuum sputtering manner. In addition, a sub reflecting film 162 is formed on a sub reflection portion 16' of the second side of the body 11, wherein the sub reflecting film 162 is made of any one of gold, silver, and copper in a vacuum sputtering manner.

Figure 4:
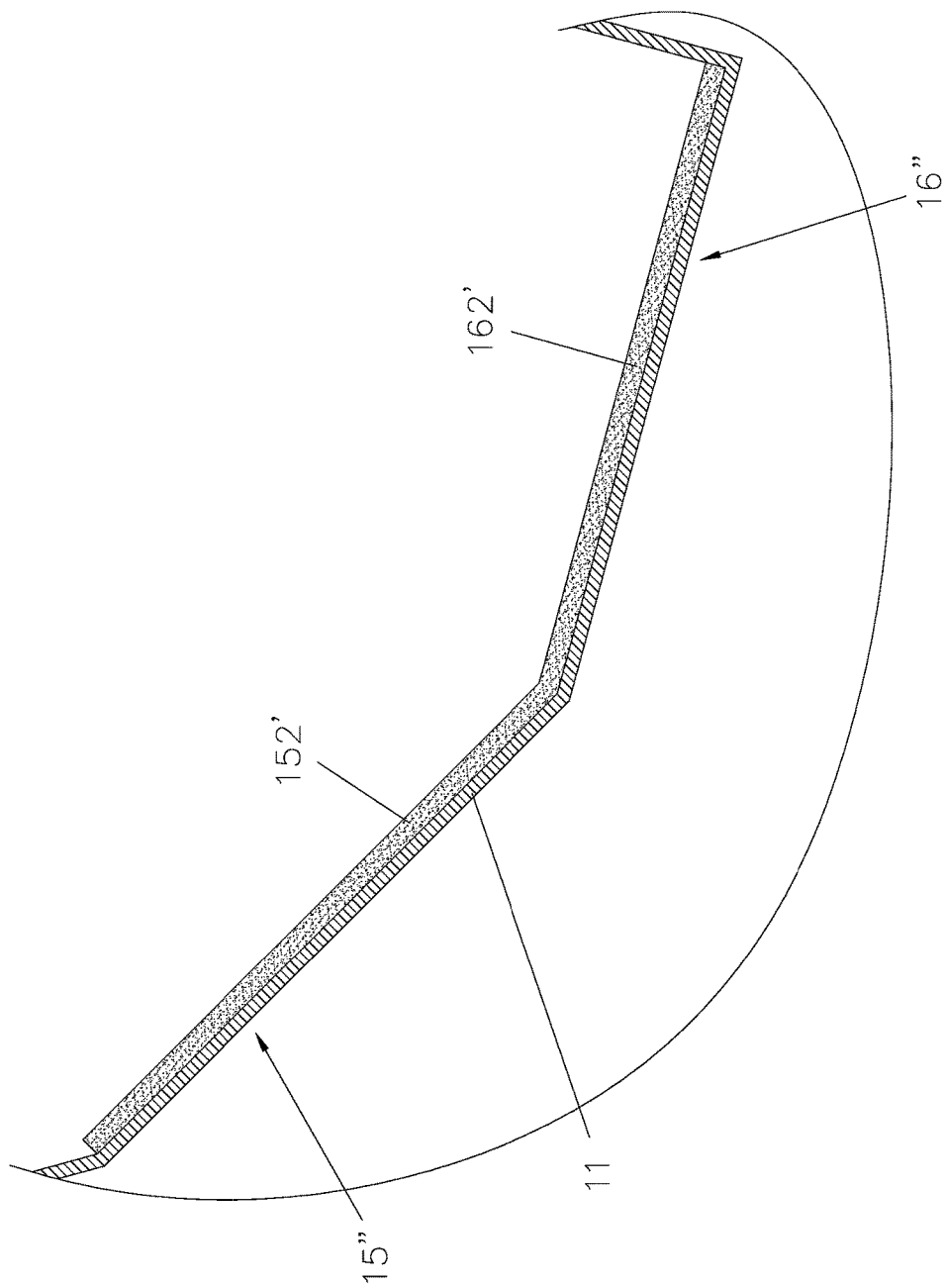
FIG. 4 is a perspective view showing the assembly of a part of a beam splitter according to a third embodiment of the present invention.

As illustrated in FIG. 4, a beam splitter 1 of a third embodiment from that of the first embodiment comprises: a main antireflection film 152' formed on a main reflection portion 15" of a second side of a body 11, wherein the main antireflection film 152' is made in a sputtering manner and its refractive index is different from the body 11. In addition, a sub antireflection film 162 is formed on a sub reflection portion 16" of the second side of the body 11, wherein the sub antireflection film 162' is made in a sputtering manner and its refractive index is different from the body 11.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A beam splitter comprising:
    a body including an inlet and an outlet, the inlet being configured to receive external beam;
    a main reflection portion located on a first side of the body, and the main reflection portion and the outlet having a first rotating angle and a second rotating angle respectively so that the main reflection portion reflects the external beam to produce a main beam;
    a sub reflection portion located on the first side of the body adjacent to the main reflection portion, an angle being defined between the sub reflection portion and the main reflection portion, and the sub reflection portion reflecting the external beam to produce a sub beam;
    a refraction portion located on a second side of the body proximate to the inlet and having a third rotating angle different from the inlet, the sub beam projecting out of the refraction portion so as to produce a deflective projection angle of the sub beam, and further having a refractive index different from that of air so as to change the deflective projection angle of the sub beam.

2. The beam splitter as claimed in claim 1 further comprising a monitor photo diode located outside the body proximate to the light emitting element and corresponding to the second side of the body, wherein the monitor photo diode is configured to detect an intensity of the sub beam.

3. The beam splitter as claimed in claim 2, wherein a location of the monitor photo diode is adjusted based on the sub beam through the refraction portion and a setting location of the sub reflection portion.

4. The beam splitter as claimed in claim 1 further comprising a first collimating lens arranged on the inlet so as to collimate the external beam.

5. The beam splitter as claimed in claim 1 further comprising a second collimating lens arranged on the outlet so as to collimate the main beam.

6. The beam splitter as claimed in claim 1, wherein at least one of the main reflection portion and the sub reflection is a mirror.

7. The beam splitter as claimed in claim 1, wherein at least one of the main reflection portion and the sub reflection is a reflecting film formed on the first side of the body.

8. The beam splitter as claimed in claim 7, wherein the reflecting film is made of metal.

9. The beam splitter as claimed in claim 1, wherein the main reflection portion has a main antireflection film formed on the first side of the body, and the sub reflection portion has a sub antireflection film formed on the first side of the body and its refractive index is different from the body.

10. The beam splitter as claimed in claim 1, wherein the refraction portion is a lens and its refractive indexes is different from that of air.

11. The beam splitter as claimed in claim 10, wherein the refractive index of the refraction portion is more than that of air.

12. The beam splitter as claimed in claim 1, wherein the first rotating angle is between 35 to 50 degrees, and more preferably, is 45 degrees.

13. The beam splitter as claimed in claim 1, wherein the second rotating angle is between 135 to 170 degrees.

14. The beam splitter as claimed in claim 1, wherein the refractive index of the refraction portion is more than the refraction index of air.

15. The beam splitter as claimed in claim 1, wherein the refraction portion is selected from a group consisting of a lens and a transparent substrate of various refractive indexes, or a combination thereof.

16. The beam splitter as claimed in claim 15, wherein the refraction portion is a lens.

17. The beam splitter as claimed in claim 1, wherein the refraction portion is made of a material that changes beam projection angle.

* * * * *